UNITED STATES PATENT OFFICE.

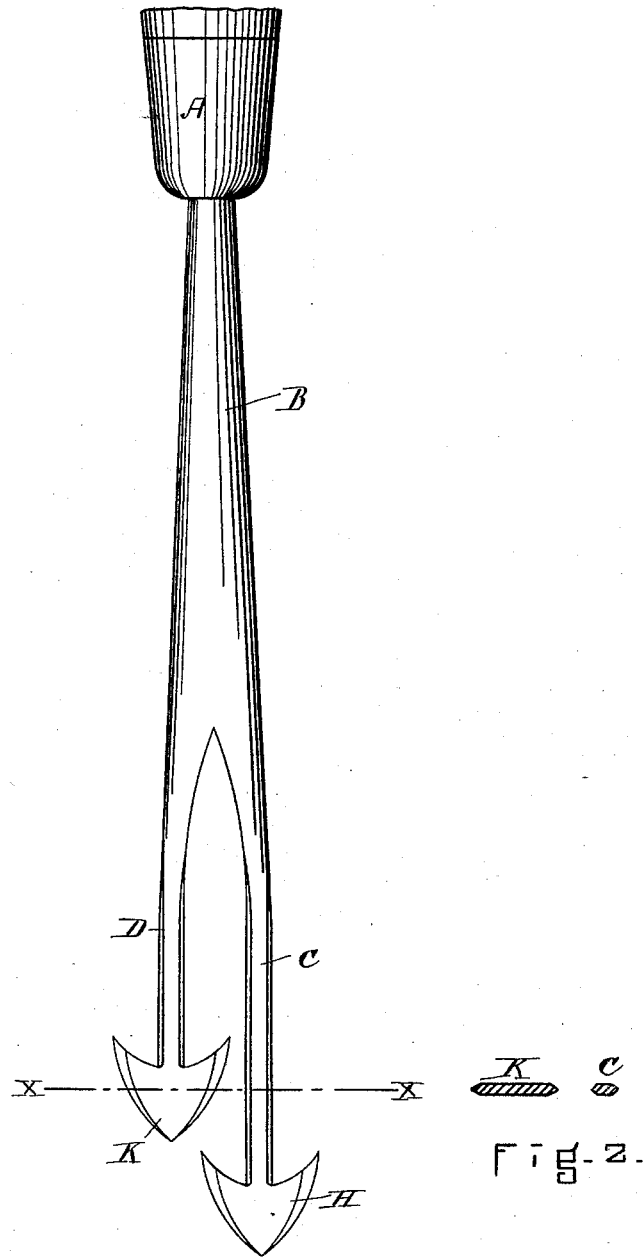

MARY A. STEBBINS, OF CHELSEA, MASSACHUSETTS.

LAWN-WEEDER.

SPECIFICATION forming part of Letters Patent No. 409,619, dated August 20, 1889.

Application filed May 22, 1889. Serial No. 311,737. (No model.)

*To all whom it may concern:*

Be it known that I, MARY A. STEBBINS, of Chelsea, in the county of Suffolk and State of Massachusetts, have invented a new and useful Improvement in Lawn-Weeders, of which the following, taken in connection with the accompanying drawings, is a specification.

The object of my invention is to so construct a lawn-weeder that it can be easily inserted at or near the roots of the weed to be removed and by a slight turn or twist be made to engage and become entangled with the roots of the weed in such a manner that in withdrawing it from the ground the weed will accompany it and be thus removed without disturbing the grass of the lawn or any herbage that it is desired to leave uninjured. This object I attain by the construction shown in the accompanying drawings, in which—

Figure 1 is an elevation showing the working part of my device full size, the handle being represented as broken off. Fig. 2 is a cross-section taken on line $x\ x$ of Fig. 1.

The working parts of my device consist in a shank B, divided into two branches C and D, each of which terminates in barbed ends H or K. The barbed end H is lower than the end K, so that in using the instrument the end H is the leading end and serves as an axis about which the whole instrument may be turned in the ground. The branches C and D are made, as shown, comparatively small, so that the instrument may be easily turned in the ground. The shank B is attached to a suitable handle A, which may be of any convenient length and style.

To use my device, the user proceeds first to force it down into the ground in close proximity to the weed which it is desired to remove, having pushed the instrument so far down into the earth as to bring both barbs H and K near to the roots of the weed, and by turning the instrument about its longer branch C (that is the branch about which it will naturally turn) the short branch D and its barb K will cause the roots of the weed to be entangled with the branches C D and the barbs H K, so that by withdrawing the instrument the weed will come with it, and from the fact that the turning of the instrument is about the longer branch C the grass or other herbage is not disturbed or injured.

I claim—

In a lawn-weeder, the combination of the shank B, having a barbed branch C extending below the barbed branch D and adapted to act as an axle for turning the instrument about, as described, and the barbed branch D, substantially as and for the purpose set forth.

MARY A. STEBBINS.

Witnesses:
 WILLIAM EDSON,
 FRANK G. PARKER.